United States Patent [19]
Kasahara et al.

[11] Patent Number: 5,196,948
[45] Date of Patent: Mar. 23, 1993

[54] IMAGE DENSITY READING APPARATUS CAPABLE OF SELECTING A DESIRED AMPLIFICATION LEVEL FOR THE DENSITY

[75] Inventors: Seitaro Kasahara; Haruo Itakura; Susumu Kurihara, all of Hachioji; Hiroshi Ishii, Kiyose, all of Japan

[73] Assignee: Konica Corporation, Tokyo, Japan

[21] Appl. No.: 547,308

[22] Filed: Jul. 3, 1990

[30] Foreign Application Priority Data

Jul. 7, 1989 [JP] Japan ................... 1-176356
Jul. 7, 1989 [JP] Japan ................... 1-176357

[51] Int. Cl.$^5$ ............................................. H04N 1/40
[52] U.S. Cl. ................................... 358/446; 358/475
[58] Field of Search ............... 358/446, 461, 443, 474, 358/475, 406, 464

[56] References Cited

U.S. PATENT DOCUMENTS 4,408,231 10/1983 Bushaw et al. ................. 358/475
4,660,082 4/1987 Tomohisa et al. ............... 358/446
4,980,778 12/1990 Wittman ......................... 358/461
5,014,332 5/1991 Nakajima et al. ............... 358/446

FOREIGN PATENT DOCUMENTS

57-208768 12/1982 Japan ............................. 358/446

Primary Examiner—Edward L. Coles, Sr.
Assistant Examiner—Thomas D. Lee
Attorney, Agent, or Firm—Finnegan, Henderson, Farabow, Garrett and Dunner

[57] ABSTRACT

An image density reading apparatus in which an image of a document is irradiated by a light source and a density signal is generated from an image light reflected from the image. In the apparatus, there is an amplifier for amplifying a density signal on the basis of an amplifying gain and a signal processor for processing the amplified density signal in accordance with a predetermined processing algorithm to output a gain control signal. The amplifier is provided with a switch for changing a gain in response to the gain control signal.

13 Claims, 6 Drawing Sheets

IMAGE DENSITY READING APPARATUS CAPABLE OF SELECTING A DESIRED AMPLIFICATION LEVEL FOR THE DENSITY

BACKGROUND OF THE INVENTION

The present invention relates to an image density reading apparatus which is used for an image forming apparatus such as a copying machine.

A copying machine commonly has the function of obtaining an image with the most adequate density on a transfer paper by adjusting the bias of a developing sleeve automatically according to the density of a document.

The above-described automatic adjusting operation can be conducted as follows. The image density signal obtained by a sensor during EE scanning is amplified and inputted into CPU (Central Processing Unit), wherein EE scanning is the motion of a light source which is moved along a document in order to obtain the density information of the document. An EE histogram is made according to the density information processed by CPU so that the density distribution of the document can be obtained. Then, the most adequate developing sleeve bias can be determined according to the density histogram.

Accordingly, the correct processing of the EE signal is essential in order to obtain the adequate developing sleeve bias. For that reason, copier manufacturers adjust all their products in their manufacturing lines as follows. Fine adjustment is made to the gain and offset in the EE signal processing circuit in order to avoid the variation of read-out density caused by the inaccuracy of the sensor and the error of the resistance of resistors composing the circuit so that the same density data can be obtained by every copier when it conducts density reading of the same document.

Figure 7:
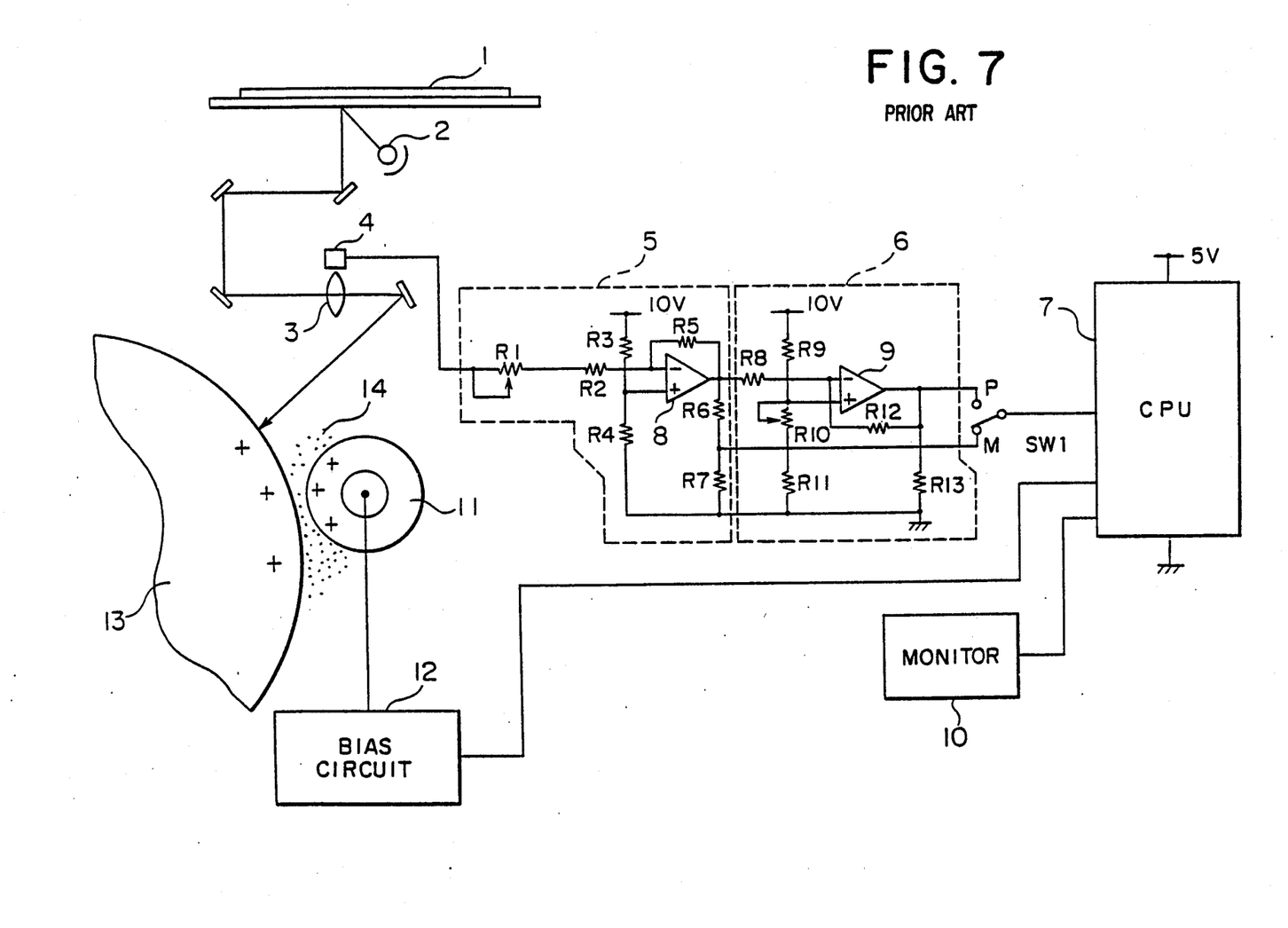
FIG. 7 is a circuit diagram of the conventional image density reading apparatus.

FIG. 7 is a circuit diagram of a conventional image density reading apparatus.

In this conventional example, the EE signal obtained by the EE scanning is processed as follows. The light emitted by the exposure lamp 2 is reflected by the surface of the document 1, wherein the surface is to be copied. The reflected light is converted into an EE signal by the EE sensor (the light receptor element) which is provided beside the optical system 3. This EE signal is amplified by the gain selecting circuit 5 and the offset adjusting circuit 6 so that the voltage of the signal can be converted into the voltage which is able to be inputted into the analog terminal of CPU 7.

The gain selecting circuit 5 is composed of the operation amplifier 8, the gain adjusting resistor R1, and the resistors R2 to R7. The output of the EE sensor 4 is inputted into the reverse input terminal of the operation amplifier 8 through the variable resistor R1 and the resistor R2. The voltage into which the power source voltage (10 V) is divided by the resistors R3 and R4, is inputted into the non-reverse terminal. The resistor R5 is provided between the output terminal and the non-reverse input terminal of the operation amplifier 8. Furthermore, the resistors R6 and R7 divide the voltage of the output signal of the operation amplifier 8. Its separating point is connected to the M side of the switch SW 1. The gain of this gain selecting circuit appears as $G = R5/(R1+R2)$, wherein each letter in the equation represents the resistance of each resistor. Consequently, the gain can be varied in the range of 2 to 10, for instance, by manually making fine adjustment to R1 for use in adjusting the gain.

The offset adjusting circuit 6 is composed of the operation amplifier 9, the variable resistor R10 for use in adjusting the offset, the resistors R8, R9, R11, R12, and R13. The output signal of the operation amplifier 8 is inputted into the reverse input terminal of the operation amplifier 9 through the resistor R8. The voltage into which the power source voltage (10 V) is divided by the resistor R9, the variable resistor R10, and the resistor R11, is inputted into the non-reverse input terminal of the operation amplifier 9. The resistor R12 is provided between the output terminal and the reverse input terminal of the operation amplifier 9. The resistor R13 is provided between the output terminal of the operation amplifier 9 and the ground. The variable resistor R10 for use in adjusting offset is manually adjusted.

When the apparatus is set to the actual operation mode, the switch SW1 is switched to the P side, wherein the actual operation mode is the mode in which the document density is actually read in. When the apparatus is set to the adjusting mode, the switch SW1 is switched to the M side.

A predetermined display is indicated by the monitor 10 according to the level of the inputted EE signal.

The bias circuit 12 supplies an adequate developing bias corresponding to the EE signal level according to the direction sent from CPU 7. The amount of toner 14 which adheres to the drum 13 is controlled by the developing bias.

The operations of the conventional example will be explained as follows.

Adjusting Mode

In order to precisely make the analog signal (the EE signal) match the voltage level of the power source of CPU 7, wherein the analog signal corresponds to the white and the black levels obtained by the EE sensor 4, the resistor R1 for use in adjusting the gain and the resistor R10 for use in adjusting the offset are manually adjusted. The adjustment is mainly conducted by the workers on the production line in a factory.

The object of this gain adjustment is to prevent the variation of the center of the EE diagram which is made by CPU 7 according to the signal sent from the EE sensor 4, wherein the variation is caused by the inaccuracy of sensors and the error of the resistance of the resistor when the apparatuses are mass-produced in a factory.

The procedure of adjustment is as follows.

First of all, the operator opens the back cover of a copier and switches the change-over switch SW1 to the M side. Then, the operator presses the copy button to start scanning to adjust the gain. The operator adjusts the resistance of the resistor R1 by turning the knob to adjust the gain (the knob is not illustrated in the drawing) watching the monitor 10 so that a prescribed display can be obtained on the monitor.

Then, the operator switches the change-over switch SW1 to the P side and turns the knob (which is not illustrated in the drawing) watching the monitor 10 so that the resistance of the resistor R10 can be adjusted.

Actual Operation

Figure 6:
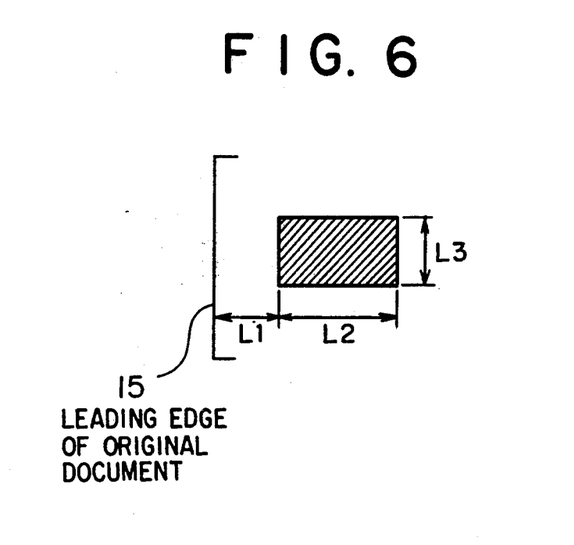
FIG. 6 is a graph which shows the readable range of document image density when the EE scanning is conducted.

The switch SW1 is switched to the P side. The document 1 is set to a prescribed position and the EE scanning is started by pressing a copy button which is not illustrated in the drawing. The light of the exposure lamp 2 reflected by the document surface is led to the drum 13 through the reflection mirror and the optical system 3, and converted into an electrical signal by the EE sensor 4 to be outputted as the EE signal. In this EE scanning process, for instance, average photometry is conducted. The density of an oblique line portion on the document as illustrated in FIG. 6, is read in. In FIG. 6, L1 is 20 mm, L2 is 120 mm, and L3 is 50 mm. The numeral 15 is the leading edge of a document.

Figure 5:
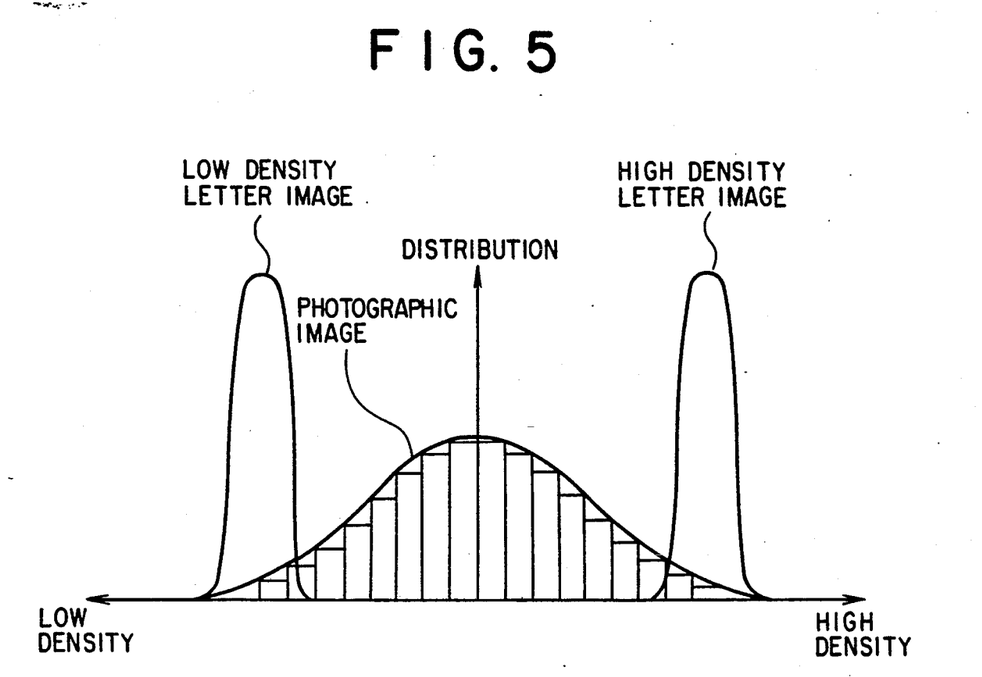
FIG. 5 is an example of a histogram which illustrates the image density which was read out.

This EE signal is amplified by the gain selecting circuit 5 and the offset adjusting circuit 6, and the output is inputted into CPU 7 through the switch SW1. CPU 7 makes the EE (the density) histogram as illustrated in FIG. 5 according to the inputted EE signal. According to the EE histogram, CPU 7 directs the bias circuit 12 to supply the developing bias which is adequate to the density of the document. When the bias voltage of the developing sleeve 11 is high, the amount of the toner 14 which adheres to the drum 13 becomes small and the density becomes light. When the bias voltage is low, the density becomes dark. By adjusting the bias voltage, a clear copy can be obtained in the cases of a light line image, a photographic image, and a dark line image.

As explained above, the conventional image density reading apparatus has the following disadvantages: the operator must open the back cover when the operator conducts initial adjustment; as he must adjust the knob manually while watching the display on the monitor, the operations become complicated; and it takes much time and labor to adjust the apparatus on the production line, which causes a decrease in the throughput in the production line.

SUMMARY OF THE INVENTION

In order to solve the problems described above, the image density apparatus of the present invention comprises: a sensor which receives the reflected light from a document and outputs an analog signal according to the amount of the received light; a density signal amplifying means which can amplify the output signal of the sensor and switch the gain stepwise; and a gain control means which can monitor the output level of the density signal amplifying means, send the control signal according to the results of monitoring, and switch the gain according to the control signal.

Furthermore, the image density reading apparatus of the present invention comprises the exposure amount control means which can control stepwise the exposure amount of a document in accordance with the switching of the gain when the gain of the above-described density signal amplifying means was switched by the gain control means.

According to the inputted image density signal, CPU automatically sets the most adequate gain by the above-described gain control means, wherein the manual operation is not necessary. The error followed by the automatic switching of the gain can be automatically corrected by the adjustment of the exposure amount.

DESCRIPTION OF THE PREFERRED EMBODIMENT

Referring to the drawings, the preferred embodiment of the present invention will be explained as follows.

Figure 1:
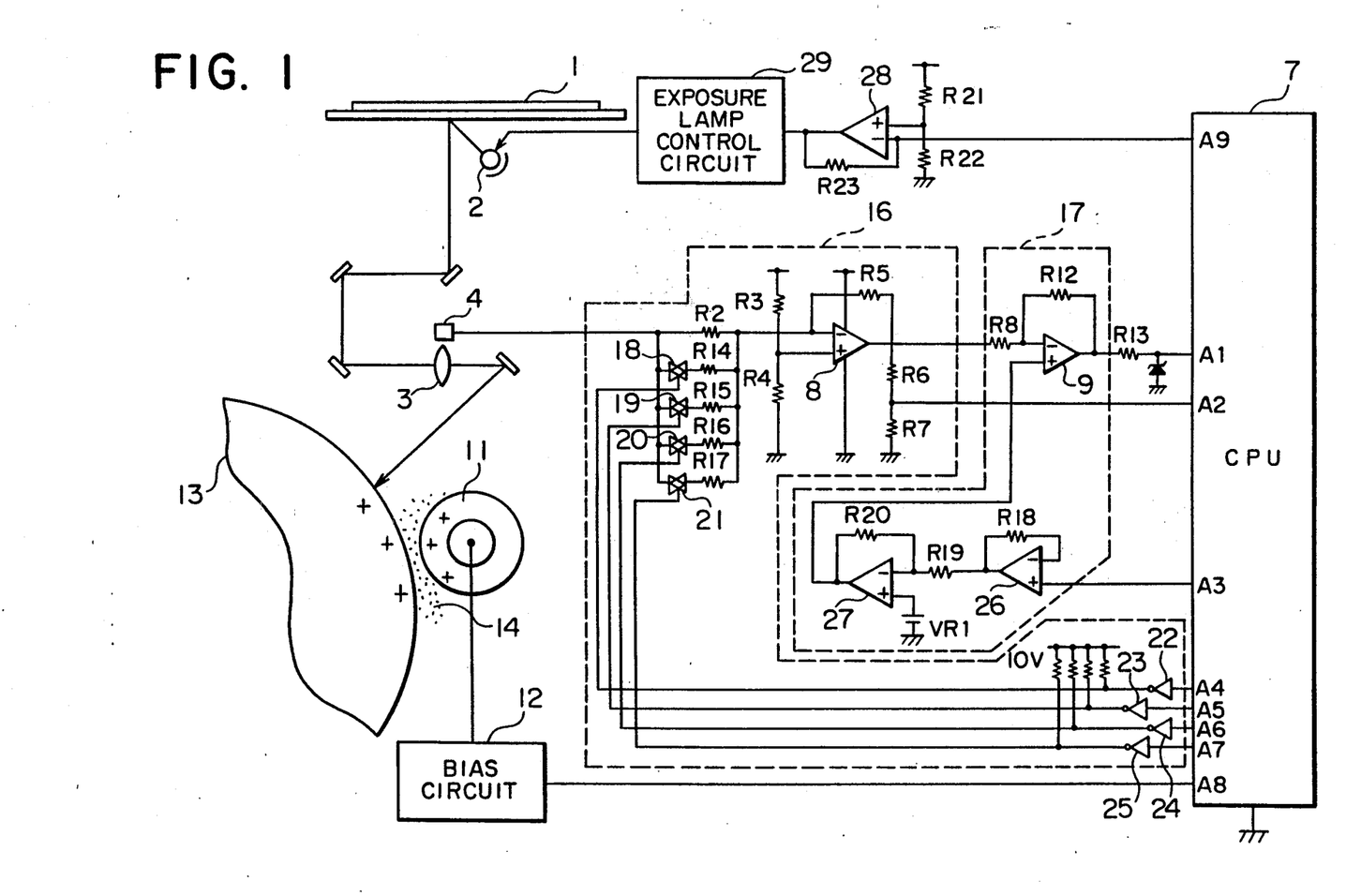
FIG. 1 is a circuit diagram of the image density reading apparatus of the present invention.

FIG. 1 is a circuit diagram of an example of the image density reading apparatus of the present invention. In FIG. 1, the portions which are the same as those illustrated in FIG. 7 or correspond to those illustrated in FIG. 7 have the same numbers as those shown in FIG. 7.

In the gain selecting circuit 16 of this example, the manually operated variable resistor R1 for gain adjustment which was installed in the conventional example, is eliminated. Instead of that, 16 kinds of compound resistances are made by the method characterized in that: 4 analog switches 18, 19, 20 and 21 are controlled by the output of CPU 7; the resistors R2 to R17 are combined in 16 ways; and as a result, 16 kinds of compound resistances are made of the resistors R2 to R17.

The analog switch 18 and the resistor R14, the analog switch 19 and the resistor R15, the analog switch 20 and the resistor R16 and, the analog switch 21 and the resistor R17 are connected in parallel with the resistor R2, and the analog switches 18 to 21 are opened and closed by the output of CPU 7 through the inverters 22 to 25. By this method, the gain can be selected in 16 ways, for instance, 2.0, 2.5, 3.0, . . ., and 9.5 times.

In the offset adjusting circuit 17, the offset adjusting resistor R10 for manual adjustment, the resistor R9 and the resistor R11 are eliminated and the offset voltage is automatically set.

The voltage follower composed of the operation amplifier 26 and the resistor R18 is connected with the analog port A3 of CPU 7. The output of the voltage follower is amplified by the reverse amplifier composed of the operation amplifier 27, the resistor R19, the resistor R20 and the standard voltage power source VR1.

The exposure lamp control circuit 29 is provided so that the error caused by switching the gain stepwise can be corrected by adjusting the amount of light, wherein the error will be described later.

The signal to control the amount of exposure which is outputted from port A9 of CPU 7 is amplified by the reverse amplifier composed of the operation amplifier 28, the resistors R21, R22 and R23, and inputted into the exposure lamp control circuit 29. The amount of light of the exposure lamp 2 is adjusted by the output of the exposure lamp control circuit 29.

Figure 2:
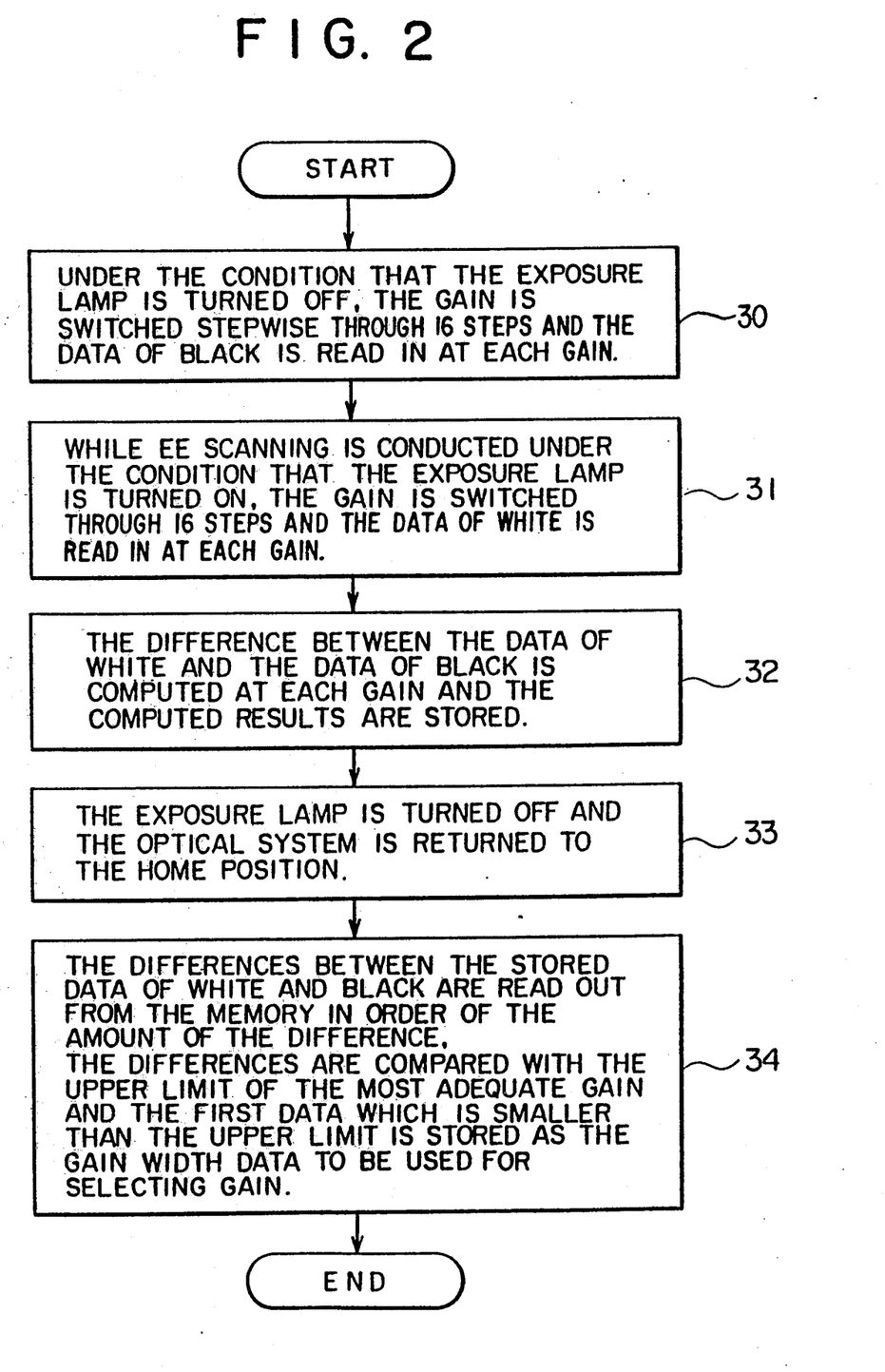
FIG. 2 is a flow chart which shows the procedure of automatic gain control.
Figure 3:
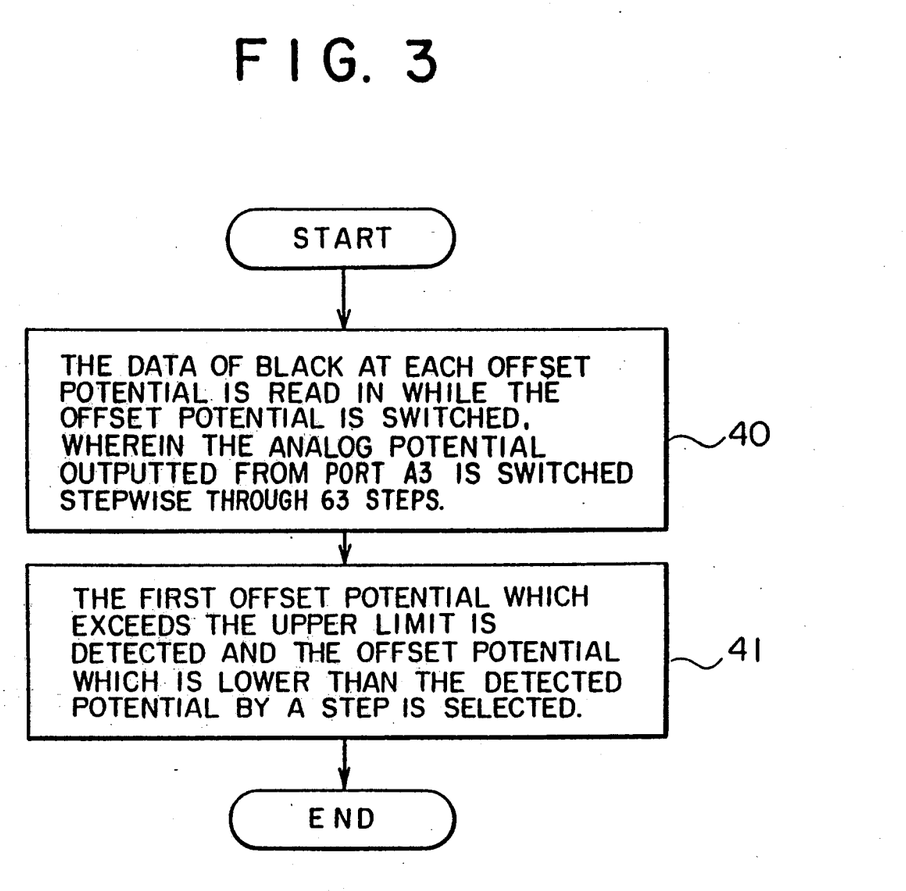
FIG. 3 is a flow chart which shows the procedure of automatic offset control.

Referring to FIG. 2 and FIG. 3, the motion to adjust the gain and the offset of the present example will be described.

FIG. 2 is a flow chart which shows the procedure of automatic gain adjustment. FIG. 3 is a flow chart which shows the procedure of automatic offset adjustment.

The motion to adjust the gain automatically

Under the condition that the exposure lamp 2 is turned off, the digital output of ports A4 to A7 of CPU 7 is switched and the gain of the gain selecting circuit 16 is switched through 16 steps from the minimum to the maximum. The EE signal at each gain is read in from the analog port A2 as the black data and stored (step 30), wherein the output of the operation amplifier 8 is divided into two by the resistors R6 and R7 to make the EE signal.

Under the condition that the exposure lamp 2 is turned on, the gain is switched through 16 steps while the EE scanning is being conducted. The EE signal at each gain is read in from the analog port A2 as the white data, and stored (step 31).

Then, the difference between the white and the black data at each gain is computed and the result is stored (step 32).

Then, the exposure lamp 2 is turned off and the optical system is returned to the home position (step 33).

Then, the stored differences between the white and black data are loaded from the memory in order of the amount of the difference and compared with the most adequate upper limit (0.925 V). The first data which is smaller than the upper limit is stored as the gain width data so that the gain can be selected.

The automatic offset adjusting motion

The analog voltage outputted from port A3 is switched to 63 steps from 0 V to 10 V so that the offset voltage can be varied from 2 V to 6 V in order to read in the black data at each offset voltage and to store the data (step 40).

Then, the first offset voltage which exceeds the prescribed upper limit is detected and the offset voltage which is lower by one step is selected (step 41).

The gain and the offset voltage are automatically adjusted as described above.

Then, the correction of the amount of exposure will be explained as follows.

Since the gain is automatically adjusted, it is not necessary to manually adjust the gain. As the automatic gain adjustment is conducted at regular intervals, the errors in the analog signal inputted into CPU 7 are caused during switching in the adjustment. When the gains are large, for instance, the gains are 9.0 and 9.5 times, the difference between the gains is 5%, which is small. However, when the gains are small, for instance, the gains are 2.0 and 2.5 times, the difference between the gains is 20%, which is large. Accordingly, when the most adequate gain is 2.4 times, the gain actually selected is 2.0 times. In this case, the output span is approximately 80% of the most adequate gain, which is not preferable.

Therefore, the gain on the gain pitch is adjusted by correcting errors which are caused when the gain is switched, by adjusting the amount of exposure so that the absolute value of the image density signal can be varied.

In other words, the signal to control the amount of exposure is sent out from port A9 of CPU 7 and this signal is amplified by the reverse amplifier which is composed of the operation amplifier 28, and the resistors R21 to R23 and inputted into the exposure lamp control circuit 29.

The exposure lamp control circuit 29 can output signals of 64 steps of voltage in the range of 56 to 80 V and this outputted voltage is supplied to the exposure lamp 2, wherein the voltage is used as the power source voltage (the root-mean-square value) so that the amount of exposure can be controlled.

For example, suppose the most adequate gain is 2.4 times when the exposure lamp 2 is turned on under the condition that the voltage is 60 V. According to the automatic gain adjustment, the gain 2.0 times is selected and the error of 0.4 times is made in this case. However, owing to the amount of exposure correction circuit, the lighting voltage of the exposure lamp 2 is automatically increased and the most adequate gain is decreased. For example, when the exposure lamp 2 is lit at the voltage of 62 V, the most adequate gain becomes 2.0. Consequently, the output span coincides with that of the most adequate gain and errors are not made.

Figure 4:
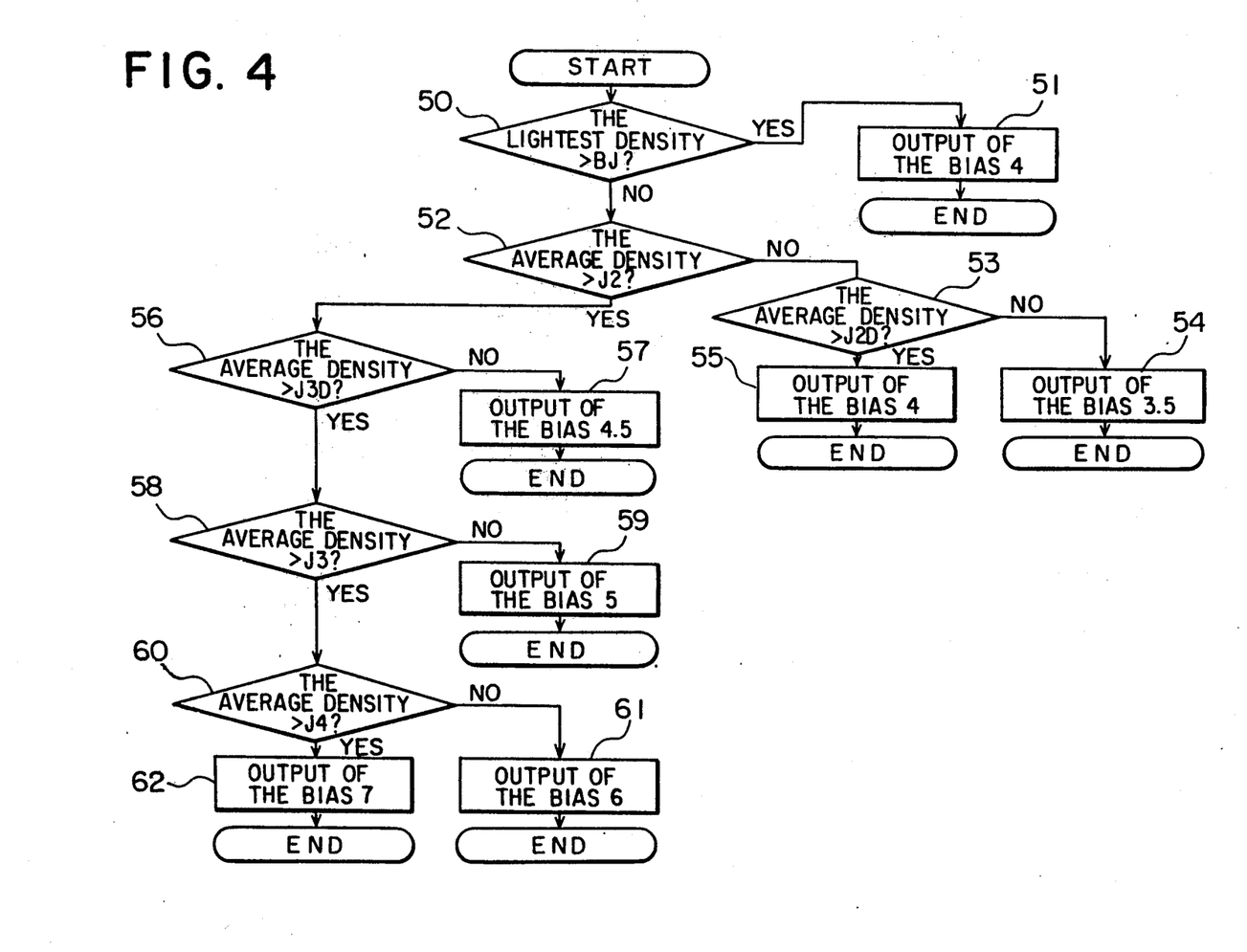
FIG. 4 is a flow chart which shows the procedure of bias setting for the developing sleeve.

Referring to FIG. 4, the procedure to set the bias of the developing sleeve 11 will be explained as follows.

First of all, there are 6 kinds of threshold voltage, which are J2D, J2, J3D, J3, J4, and BJ. (They are arranged in order of value. The first one is the smallest and the last one is largest.)

Then, the operation to determine the bias is conducted. The lightest density is compared with the threshold value BJ (step 50). When the lightest density is darker than the threshold value BJ, since it is presumed that platen-over occurs, the bias 4 is outputted (step 51). The platen-over means a condition where a scanning is carried while no document is placed on a platen. When the lightest density is lighter than the threshold value BJ, the average density is compared with the threshold value J2 (step 52). When the average density is lighter than the threshold value J2, it is compared with the threshold value J2D (step 53). According to the result of the comparison, either the bias 3.5 or the bias 4 is outputted (step 54 and step 55). When the average density is larger than the threshold value J2, it is compared with the threshold value J3D to determine which is larger (step 56). When the average density is smaller than the threshold value J3D, the bias 4.5 is outputted (step 57). When the average density is larger than the threshold value J3D, it is compared with the threshold value J3 to determine which is larger. When the average density is smaller than the threshold value J3, the bias 5 is outputted (step 59). When the average density is larger, it is compared with the threshold value J4 to determine which is larger (step 60). When the average density is smaller than the threshold J4, the bias 6 is outputted (step 61). When the average density is larger than the threshold values J4, the bias 7 is outputted (step 62).

In this example, the gain is switched stepwise by the opening and closing control of the analog switch. Accordingly, automatic gain adjustment can be conducted at a high speed. Furthermore, as the offset adjustment is automatically conducted, the operation time can be reduced and its effect is remarkable. According to the actual operation to which this example is applied, the adjusting time could be reduced by 1 minute compared with the conventional apparatus. Errors which are caused by switching the gain stepwise can be positively corrected by controlling the amount of exposure. Accordingly, reliability is not decreased.

As explained above, in the image density reading apparatus of the present invention, the gain is automatically adjusted by switching multi-stepwise and the errors caused during the adjustment can be corrected by varying the amount of exposure. Consequently, the effect can be achieved that the adjustment can be automatically conducted without decreasing the accuracy, and that the process of manufacturing apparatus can be simplified and furthermore the operation time can be reduced.

What is claimed is:

1. An image density reading apparatus in which a document is irradiated by a light source and density data is generated on the basis of an image reflected from the document, comprising:

reading means for reading the image and generating a density signal;

amplification means for amplifying the density signal, the amplification means including a switch member for changing amplification of the density signal over a plurality of amplification levels to produce a plurality of amplified density signals;

signal processing means for selecting a desired amplification level from the plurality of amplification levels by using the plurality of amplified density signals as a selection criterion and outputting a gain control signal for controlling the switch member to provide the desired amplification level, the signal processing means including means for determining a difference amount for each amplification level, the difference amount being a difference between a black density signal and a white density signal at an amplification level, and means for determining the desired amplification level by selecting the amplification level yielding a desired difference amount; and exposure control means for controlling an amount of light output by the light source in accordance with the amplification level set by the switch member.

2. The apparatus of claim 1, wherein the reading means includes means for generating a black density signal by reading an image while the light source is not energized and a white density signal by reading an image while the light source is energized.

3. The apparatus of claim 1, wherein the signal processing means includes a memory for storing the black and white density signals for each amplification level.

4. The apparatus of claim 1, wherein the amplification means comprises an amplifier and the switch member includes a plurality of switches which are disposed between the reading means and the amplifier and are arranged in parallel with each other, the amplification level being designated by selection of the switches to be activated.

5. The apparatus of claim 1, further comprising means for adjusting offset.

6. The apparatus of claim 1, wherein the means for determining the desired amplification level by selecting the amplification level yielding a desired difference amount includes means for locating a difference amount that is less than a predetermined amount and closer to the predetermined amount than the difference amount of any other amplification level having a difference amount less than the predetermined amount.

7. An image density reading apparatus in which a document is irradiated by a light source to produce an image, comprising:

reading means for reading the image and generating a density signal;

amplification means for amplifying the density signal, the amplification means including switching means for altering the amplification of the density signal over a plurality of predetermined amplification levels to output a plurality of amplified density signals; and signal processing means for selecting a desired amplification level from the plurality of predetermined amplification levels by using the plurality of amplified density signals as a selection criterion and for outputting a gain control signal for controlling the switching means to provide the desired amplification level, the signal processing means including means for determining a difference amount for each amplification level, the difference amount being a difference between a black density signal and a white density signal at an amplification level, and means for determining the desired amplification level by selecting the amplification level yielding a desired difference amount.

8. The apparatus of claim 7, wherein the means for determining the desired amplification level by selecting the amplification level yielding a desired difference amount includes means for locating a difference amount that is less than a predetermined amount and closer to the predetermined amount than the difference amount of any other amplification level having a difference amount less than the predetermined amount.

9. The apparatus of claim 7, wherein the reading means includes means for generating the black density signal when the light source is not energized and the white density signal when the light source is energized.

10. The apparatus of claim 7, wherein the signal processing means includes a memory for storing the black density signal and the white density signal for each amplification level.

11. The apparatus of claim 7, wherein the amplification means further includes an amplifier and the switching means includes a plurality of switches which are disposed between the reading means and the amplifier and are arranged in parallel with each other, the amplification level being designated by selection of the switches to be activated.

12. The apparatus of claim 7, further comprising exposure control means for controlling an amount of light output by the light source in accordance with the amplification level set by the switching means.

13. The apparatus of claim 7, further comprising means for adjusting offset.

* * * * *

UNITED STATES PATENT AND TRADEMARK OFFICE
CERTIFICATE OF CORRECTION

PATENT NO. : 5,196,948
DATED : March 23, 1993
INVENTOR(S) : Seitaro Kasahara et al.

It is certified that error appears in the above-indentified patent and that said Letters Patent is hereby corrected as shown below:

On the title page, item [54] and in column 1, line 4, after "DENSITY" insert --SIGNAL--.

Signed and Sealed this

First Day of February, 1994

Attest:

BRUCE LEHMAN

Attesting Officer

Commissioner of Patents and Trademarks